United States Patent [19]
Streichenberger

[11] Patent Number: 5,884,585
[45] Date of Patent: Mar. 23, 1999

[54] UNDERWATER HIGH RELIEF FENCE HABITAT

[76] Inventor: Rodolphe Streichenberger, 75 Sea Island Dr., Newport Beach, Calif. 92660

[21] Appl. No.: 969,933

[22] Filed: Nov. 28, 1997

[51] Int. Cl.[6] .................................................. A01K 61/00
[52] U.S. Cl. .......................... 119/221; 119/208; 119/223; 119/238; 405/26
[58] Field of Search .................................... 119/207, 208, 119/219, 221, 23, 237, 238, 239, 216, 215; 405/24, 23, 26

[56] References Cited

U.S. PATENT DOCUMENTS

| | | | |
|---|---|---|---|
| 1,815,521 | 7/1931 | Miyagi | 119/238 |
| 3,898,958 | 8/1975 | Pranis, Jr. | 119/221 |
| 4,086,875 | 5/1978 | Lindbergh | 119/216 |
| 4,198,925 | 4/1980 | Lindbergh | 119/216 |
| 4,316,431 | 2/1982 | Kimura | 119/221 |
| 4,441,453 | 4/1984 | McMickle | 119/221 |
| 4,669,419 | 6/1987 | Kato et al. | 119/221 |
| 4,798,169 | 1/1989 | Rosen et al. | 119/223 |
| 4,913,094 | 4/1990 | Jones et al. | 119/221 |
| 4,947,791 | 8/1990 | Laier et al. | 119/221 |
| 4,950,104 | 8/1990 | Streichenberger | 119/237 X |
| 4,993,362 | 2/1991 | Jimbo | 119/221 |
| 5,669,330 | 9/1997 | O'Hare | 119/221 X |

*Primary Examiner*—Michael J. Carone
*Assistant Examiner*—James S. Bergin

[57] ABSTRACT

A fence-like habitat for sheltering and feeding fish, and practicing aquaculture. The fence serves as a shield for small and juvenile fish which seek protection from predators and water movement. The habitat offers substrates for use in the aquaculture of seaweed and shellfish. A complementary bottom habitat is formed by the detachment and drop of seaweed and shellfish to the bottom of the water.

10 Claims, 1 Drawing Sheet

UNDERWATER HIGH RELIEF FENCE HABITAT
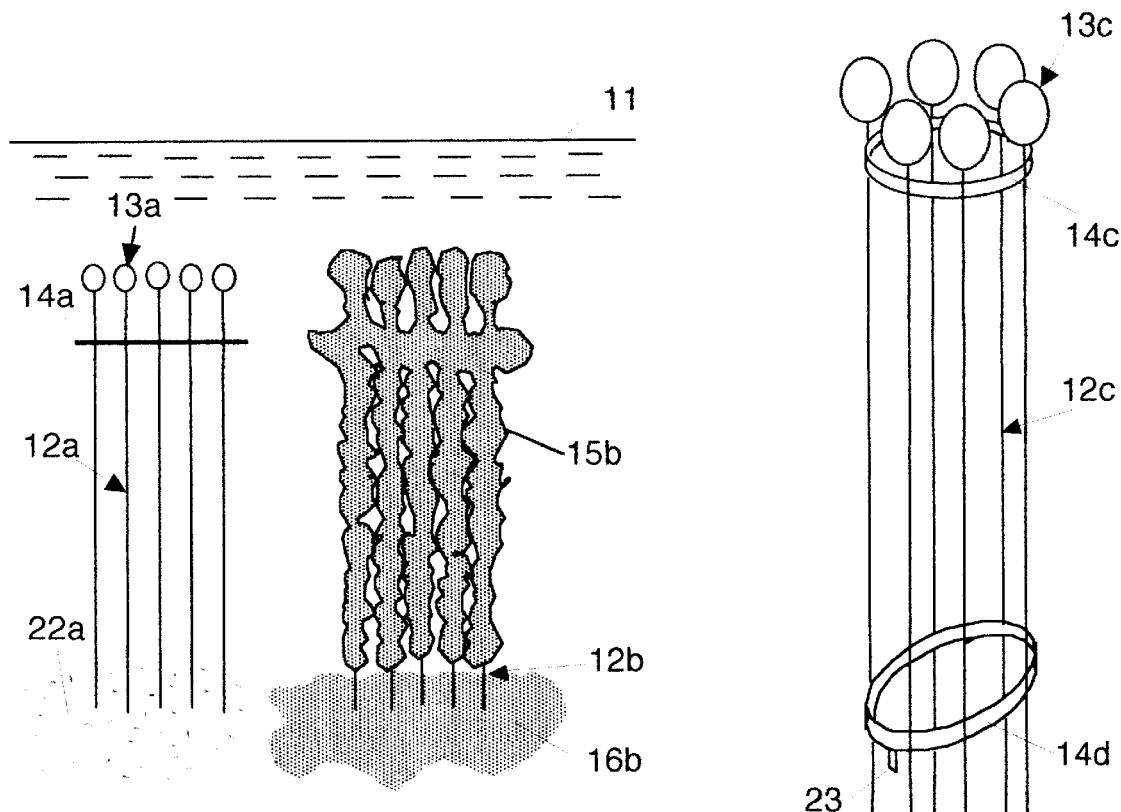
FIG. 1
FIG. 2
FIG. 3
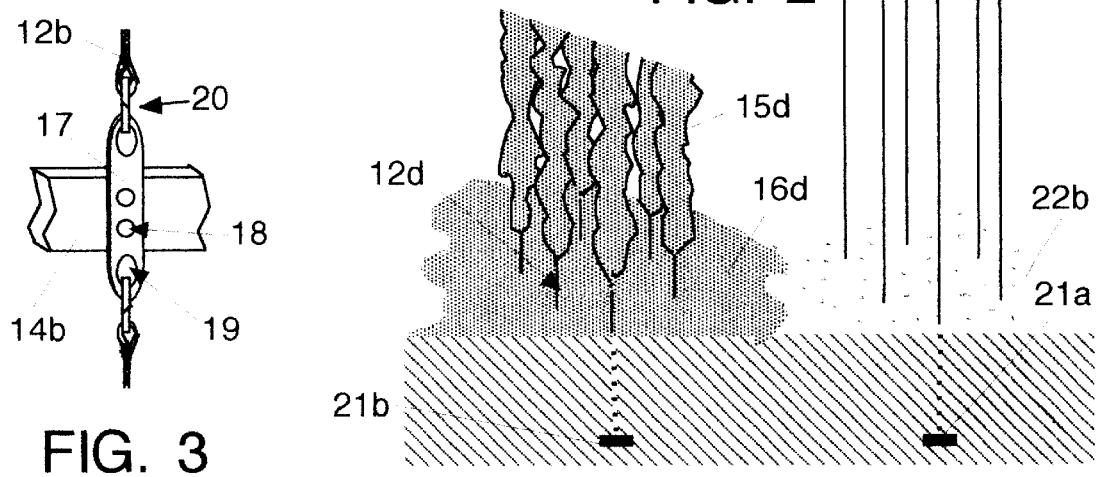

UNDERWATER HIGH RELIEF FENCE HABITAT

The invention relates to marine habitats which are essential to the sheltering, feeding, and reproducing of fish and other aquatic organisms. Especially, the invention relates to artificial habitats raising to a high level above the floor of a body of water and which defend small fish against predators and water movement.

BACKGROUND

Heretofore, a variety of artificial substrates or artificial reefs have been proposed, constructed, and placed on a water bottom for the building of marine habitats.

Most of these artificially built marine habitats are of low relief, often less than one meter above the water bottom. An example of these low relief habitats is the "Self anchoring tire-made artificial reef" of my invention that I proposed in application Ser. No. 115,455 of Sep. 1, 1993.

Seldom artificial habitats rising tens of meters and more above the floor of a body of water have been proposed. Some devices are known which float in superficial waters as, for example, the fish attraction device F.A.D. These attraction devices are not to be confused with the present invention because they are exclusively made for attracting and catching fish but not to feed and shelter fish.

On Apr. 7, 1987, in my application Ser. No. 35,449, and on Aug. 10, 1989, in my application Ser. No. 392,055, I proposed the use of buoyant tubes, floating several meters high in the water column. These tubes are made for shallow waters. They affix vegetal and animal organisms and they offer to fish large quantities of food as well as relative shelter. But, these buoyant tubes are too fragile to be used on a very extended height. One weakness is in the mooring's single point where resistance to traction equals the resistance of the plastic material the tubes are made of. For extended height, a special reinforcement of the plastic tubes, at their mooring point and all along their length, would be unavoidable and costly. Moreover, joining one tube to another tube and repeating the operation on a great length would also be fragile and costly. Another difficulty with long buoyant tubes is that they are difficult to move in and out the water for maintenance and/or aquacultural work. Also, these tubes which stand vertically underwater, as trees in a forest, do not offer a sufficient shield for small fish against predators and strong water movement. For juvenile fish a special protection is needed. Repopulating depleted fisheries by protecting juvenile fish is the most important function of marine habitats

OBJECTS AND ADVANTAGES

Accordingly, the applicant has recognised the ecological necessity to build aquatic habitats extending high in the water column. One of the advantages of the greater height of these habitats is to allow a greater number of affixed organisms to catch more nutrients in the same water column. Another advantage is that fish are less exposed to wave action in the deeper sections of these habitats. Another advantage is that high relief habitats generate a greater amount of fallen organisms on the bottom below. When a large quantity of affixed organisms detach from the substrates of their habitat and fall in mass on the water bottom they develop a bottom habitat suitable for the life of benthic species. Mussels, for example, when falling in mass on the bottom make mussel beds or mussel mounts which are strong enough to resist predation and wave action. If a critical mass of fallen organisms is not there, the bottom habitat will not form. High relief habitats, which drop many detached organisms on the same place at the water bottom, are more efficient than low relief habitats for the formation of essential bottom habitats.

Another advantage of the invention is that the proposed habitat has been conceived and designed as a fence through which larger predators chasing a prey cannot pass easily. Also the fence deflects currents and waves creating an area of calm waters for the shelter of small and/or juvenile fish.

According to a first disposition of the present invention, the underwater high relief habitat is made of linear flexible material which offers a substrate on which aquatic organisms will grow. Artificial substrates such as, for example, ropes and cables are juxtaposed to form a fence or barrier standing vertically in the water column. They are moored on the water bottom by their lower end, and are suspended by their upper end under a floating device. When aquatic organisms affix and grow on these substrates the space between two juxtaposed substrates progressively reduces. After a period of time the reduced space between two juxtaposed substrates allows the smaller fish to pass but prevents the larger fish to pass. However, the reduction of space is not total because of the friction caused by the water movement between organisms affixed on two different substrates. At the time of construction, the builder anticipates a certain growth of affixed organisms and determines how much space is best to be left between two juxtaposed substrates. According to his knowledge the builder can make different spaces between the substrates of a same fence.

According to another disposition and to facilitate maintenance and aquacultural operations, the substrates composing a fence can be detached, pulled out of the water, and brought onto the deck of a boat.

According to a preferred embodiment of the invention each artificial substrate is moored by a mooring line with a reversing anchor vertically buried in a sedimentary bottom as it has been described in my Apr. 7, 1987 patent application. Several substrates connected together by a connecting device can be moored by a single mooring line with a reversing anchor.

According to another disposition of the invention one substrate is suspended under one floating device.

According to another disposition of the invention several substrates are suspended under one floating device.

According to another disposition of the invention a belt is fastened on the substrates to reduce their displacement in high energy waters and to avoid friction and entanglement. . . Several belts can be fastened at different heights of the habitat. Belts can be flexible, semi-rigid, rigid, and buoyant or non buoyant.

According to another disposition of the invention floating devices are disposed along the substrates at different heights of the habitat.

According to a preferred embodiment of the invention the substrates composing the fence enclose a certain volume of water.

DRAWING FIGURES

FIG. 1 is an underwater view of my invention.

FIG. 2 shows two segments of a habitat enclosing two volumes of water.

FIG. 3 shows the fastening of a belt on a substrate.

REFERENCE NUMERAL IN DRAWINGS

| | |
|---|---|
| 11 | water surface |
| 12a | group of substrates |
| 12b | group of substrates |
| 13a | group of floats |
| 13c | group of floats |
| 14a | belt |
| 14c | belt |
| 14d | belt |
| 15b | affixed organisms |
| 15d | affixed organisms |
| 16b | bottom habitat |
| 16d | bottom habitat |
| 17 | flat piece |
| 18 | bolts |
| 19 | openings |
| 20 | clips |
| 21a | buried anchor |
| 22a | sandy bottom |
| 23 | air fill valve |

DESCRIPTION

FIG. 1 shows two segments of a high relief fence habitat. On the left side of this figure is shown a segment of the habitat which has been recently built under water surface 11 on sandy bottom 22a. This segment consists of a group of five substrates 12a. No sessile organisms have yet affixed on this new immersed segment of the habitat which is still barren. Each substrate of substrates 12a is made of flexible material, such as a 30 mm diameter, polyetyethylene rope. Each one of substrates 12a is suspended under one float of a group of five floats 13a. Each one of substrates 12a is moored on the water bottom 22a by a buried reversible anchor as the anchor 21a and 21b seen in FIG. 2. A belt 14a made of water-resistant material such as, for example, fiberglass connects together substrates 12a.

On the right side of FIG. 1 is shown another segment of the habitat which has been built since a long time. This segment consists of five substrates 12b, a mass of affixed aquatic organisms 15b, and a bottom habitat 16b. Also, it consists of five unshown floats, and one unshown belt. Organisms 15b are mainly shellfish and seaweed which have grown on substrates 12b. Spaces, between two juxtaposed substrates of substrates 12b, have been reduced by the growth of organisms 15b which gives juvenile and small fish a protection against predators and against strong wave action. Below, a bottom habitat 16b has been formed by fallen organisms, such as mussels, which have detached from above substrates 12b.

FIG. 2 shows two views of a high relief habitat built to form two enclosures. On the right side of the figure is shown the recently built habitat consisting of six substrates 12c, six floats 13c, and two belts 14c and 14d. No sessile organisms have already affixed on this segment of the habitat which is still barren. Substrates 12c are moored on sandy bottom 22b, disposed in a circle, and connected by circular belts 14c and 14d. Belt 14d is buoyant and inclined, made of a polyethylene tube with an air fill valve 23 at its lower point. Buoyant belt 14d works as a belt and also as one floating device under which several substrates 12c are suspended. (This insertion answers Remark 4 by specifying how several substrates can be suspended under one floating device, as for example substrates 12c are suspended under one buoyant belt 14d which is shown in FIG. 2). Betweeen belts 14c and 14d the upper and lower parts of each substrate of substrates 12c are detachable for maintenance and/or aquacultural operations. When one substrate of substrates 12c is detached by a diver for the harvest of mussels or oysters, for example, this detachment does not destabilize the flotation of the whole habitat. Each substrate of substrates 12c is moored on the sandy bottom 22b by a buried reversing anchor 21a which has been installed, deep in the sediments, by a water jet according to the process described in my application Ser. No. 35,449 of Apr. 7, 1987.

On the left side of FIG. 2 is shown, after the passing of time, the high relief habitat which encloses a volume of water and consists of six substrates 12d, a mass of affixed organisms 15d and a bottom habitat 16d. This full-grown habitat is covered by affixed organisms 15d. The spaces between two juxtaposed substrates of substrates 12d have been reduced by the growth of organisms 15d which gives juvenile and small fish a protection against predators and against strong wave action. Bottom habitat 16d, which is made of fallen mussels, is developing on the sandy bottom.

FIG. 3 shows how belts 14a, b, c, and d are attached to substrates 12a, b, c, and d. A flat piece 17 made of water-resistant material such as, for example, stainless metal, is fixed by bolts 18 on a belt 14a, b, c, or d. At the two ends of piece 17 two openings 19 allow the upper and lower parts of a substrate of substrates 12a, b, c, or d to be attached by clips 20 to belts a, b, c, and d. For maintenance or aquacultural operations the detachment of substrates 12a, b, c, and d is made by a diver without compromising the flotation and stability of a whole segment of a habitat.

SUMMARY, RAMIFICATIONS, AND SCOPE

Thus the reader wiil see that the underwater relief fence-like habitat suspended under floats in the water column, develops long substrates on which aquatic organisms affix and grow. Juvenile and small fish hiding behind the fence-like habitat are protected from wave action and from predators which cannot easily chase them between the reduced openings of the habitat's fence. The high relief habitat develops an essential bottom habitat where benthic species thrive.

While my above description contains many specificities, these should not be construed as limitations on the scope of the invention, but rather as an exemplification of one preferred embodiment thereof. Many other variations are possible. For example, at the water bottom and around the substrates a net is vertically spread and tightened to make a special enclosure inside which the fallen organisms accumulate. Another variation consists of attaching small aquacultural cages along the substrates for the cultivation of, for example, scallops.

The invention is expected to serve the development of new aquatic habitats whose creation is indispensable to the restoration of natural aquatic resources. It will also serve the development of aquaculture.

Accordingly, the scope of the invention should be determined not by the embodiments illustrated, but by the appended claims and their legal equivalents.

I claim:

1. An underwater habitat for sheltering and feeding fish, and practicing aquaculture comprising a plurality of linear and flexible juxtaposed substrates on which aquatic organisms affix and grow, said substrates being moored on the floor of a body of water and suspended under floats said substrates connected to each other by at least one belt so that they form a fence through which small fish can pass but larger fish cannot pass.

2. The fence of claim 1 wherein the space between the juxtaposed substrates is reduced by the growth of marine organisms but is not totally reduced whereby small fish can pass through the reduced space between the juxtaposed substrates.

3. The juxtaposed substrates of claim 1 wherein said substrates are independently moved by the water movement whereby friction can occur between organisms growing on the juxtaposed substrates and the space between said substrates cannot be totally closed by the progressive growth of said organisms.

4. The fence of claim 1 wherein the fence is a barrier which prevents the larger fish crossing from one side to the other side.

5. The fence of claim 1 wherein the fence forms the perimeter of an enclosure that shelters smaller fish and shields them from larger fish.

6. The fence of claim 1 wherein several substrates are suspended under one floating device.

7. The belt of claim 1 wherein said at least one belt is a float.

8. The belt of claim 1 wherein said at least one belt is inclined.

9. The juxtaposed substrates of claim 1 wherein said substrates are detachable from the floats and the at least one belt under which they are suspended.

10. A method of creating an underwater habitat comprising the steps of:

juxtaposing a plurality of linear, flexible artificial substrates, said substrates being moored on the floor of a body of water, and suspended under floats, so that a fence is formed by said juxtaposed substrates said substrates connected to each other with each substrate being independently moved by the water movement;

waiting for the progressive growth of aquatic organisms on the substrates whereby spaces between the substrates are reduced so smaller fish can still pass through reduced spaces in the fence while larger fish cannot pass;

waiting for said aquatic organisms to grow larger and to progressively reduce the spaces between juxtaposed substrates so that the water movement creates friction between organisms on one substrate and organisms on another opposing substrate whereby the spaces between said substrates cannot be totally closed by the progressive growth of said organisms;

waiting for the detachment of aquatic organisms from the substrates whereby said detached organisms fall on the floor of the water, accumulate, and form a bottom habitat.

\* \* \* \* \*